United States Patent Office

3,547,866
Patented Dec. 15, 1970

3,547,866
CHLORINATING POLYETHYLENE
Hans-Georg Trieschmann, Hambach, Gerhard Zeitler, Hessheim, Heiner Dickaeuser and Lothar Reuter, Ludwigshafen (Rhine), and Helmut Pfannmueller, Limburgerhof, Pfalz, Germany, assignors to Badische Anilin- & Soda-Fabrik Aktiengesellschaft, Ludwigshafen (Rhine), Germany
No Drawing. Filed Aug. 27, 1968, Ser. No. 755,715
Claims priority, application Germany, Aug. 29, 1967, 1,720,295
Int. Cl. C08f 27/03
U.S. Cl. 260—94.9                                    4 Claims

ABSTRACT OF THE DISCLOSURE

A process for chlorinating polyethylene in which polymer particles having a relatively large specific surface are chlorinated.

---

This invention relates to a process for chlorinating ethylene polymers in finely divided form in the gas phase.

Methods are already known for chlorinating polyolefins in which gaseous chlorine is allowed to act on finely particled polyolefins in the absence of solvents or dispersing agents. Thus for example polyethylene has been chlorinated in a fluidized bed or in a rotary kiln. In these methods finely particled polyethylene is used which has an average particle diameter in the range from 50 to 300 microns. These finely particled ethylene polymers are obtained for example by polymerization of ethylene with Ziegler catalysts in suspension or in the gase phase or by mechanical comminution of high pressure polyethylene. It is found, however, that difficulties are encountered in these methods which cause disturbances in the course of the reaction so that products having unsatisfactory properties are obtained. The finely particled polymers stick to the walls of the vessel and to stirring means. This is chiefly attributable to the relatively large specific surface of the particles. The adherent fraction is chlorinated to a very great extent because of the long residence time in the reactor so that unstable products are obtained.

The object of this invention is to provide a process in which polyethylene can be chlorinated without deposits occurring on the vessel wall and stirring means.

Another object of the invention is to prepare chlorinated polyethylene which has an improved thermal stability.

These objects are achieved according to this invention in a process in which gaseous chlorine is allowed to act in the absence of solvents and suspension agents on finely particled compact polyethylene which has a particle diameter within the range from 200 to 800 microns and accordingly has a specific surface of from 70 to 300 cm.$^2$/g. The specific surface may be calculated from the particle diameter and the density of the compact polyethylene particles by assuming the particles to be spherical.

Homopolymers of ethylene and copolymer of ethylene with other singly unsaturated olefins are especially suitable as ethylene polymers. The copolymers may contain for example up to 10% by weight of polymerized units of propylene or n-butene. Ethylene polymers which have been obtained by the method of high pressure polymerization are particularly suitable. The process has particular importance for the chlorination of polyethylene having a molecular weight of from 10,000 to 180,000 and a density within the range from 0.880 to 0.938.

The particles should have a specific surface in the range from 70 to 300, preferably from 100 to 200, cm.$^2$/g. The particle size (diameter) of the polymers should be from 200 to 800, preferably from 400 to 600, microns. Olefin polymer particles of this size can be obtained for example by atomizing a polymer melt. The particles are then obtained in a compact, approximately spherical shape.

Chlorination of finely particled olefin polymers is carried out in the gas phase, i.e., in the absence of solvents or dispersing agents. It is advantageous to use a fluidized bed, a rotary kiln or a stirred vessel. The chlorination is advantageously carried out at temperatures of from −10° to +80° C., particularly from 20° to 50° C.

The chlorination may be carried out at pressures of from to 10 atmospheres gauge, preferably at atmospheric pressure. Inert gas, such as nitrogen or helium, may be present in the reaction chamber in addition to chlorine and the finely particled polyolefins. Sometimes it is advantageous to carry out the chlorination under the action of ultraviolet light other high energy radiation or light of the visible wavelength range or in the presence of chlorination catalysts.

Products which contain 1 to 40% by weight of chlorine can be prepared by the process. The chlorination of the molecules takes place statistically uniformly.

It has now been found that, surprisingly, when particles having the specific surface and range of size claimed according to this invention are chlorinated, a uniform chlorination of the molecules in the composition takes place. Deposits and agglomerations do not take place in the process according to this invention so that overchlorination of the particles, with the detrimental properties of the product associated therewith, does not occur.

The invention is illustrated by the following examples in which parts and percentages are by weight. The molecular weights are determined by the method of Duch and Küchler described in "Zeitschrift für Elektrochemie" volume 60 (1956), page 218.

EXAMPLE 1

100 parts of high pressure polyethylene having a molecular weight of 100,000 and a density of 0.918 and particle diameters of 400 to 600 microns and also having a specific surface of 160 cm.$^2$/g. is treated at 20° C. with 10 parts of gaseous chlorine in a vessel while stirring. The polyethylene has absorbed 20.4% of chlorine with reference to polyethylene after six hours. The product can be moved and mixed well throughout the reaction.

The same polyethylene which has been brought to powder form having a specific surface of more than 500 cm.$^2$/g. by grinding or reprecipitation, for example by dissolving it in hot xylene and precipitating it with methanol, can only be treated for one hour with chlorine. Mixing is then no longer possible because of agglomeration of the powder.

EXAMPLE 2

100 parts of high pressure polyethylene as described in Example 1 having a particle diameter of 300 microns and a specific surface of 250 cm.$^2$/g. is treated with 20 parts of gaseous chlorine per hour at 30° C. in a rotating tube (ratio of diameter to length 1:5) at a degree of filling of 50% and a rotational speed of 20 r.p.m. After five hours, the polyethylene has a chlorine content of 34%. The reaction mixture is capable of flowing freely during the whole of the reaction period. The chlorinated polyethylene does not show any discoloration within one hour in a thermal test at 180° C. while excluding air. The product can be processed by conventional methods into film, sheeting, tubes and the like.

EXAMPLE 3

In each case 100 parts of high pressure polyethylene having different particle sizes is treated with 10 parts of gaseous chlorine at 30° C. in a vessel while stirring. Chlorination is stopped after seven hours. The results are given in the following table in which the following abbreviations are used:

Ex.=Experiment
Density=density in g./ccm.
Diameter=diameter in microns
SS=specific surface in cm.²/g.
Cl=chlorine content in percent

| Ex. | Density | Diameter | SS | Cl |
|---|---|---|---|---|
| a | 0.918 | 400–600 | 180 | 26 |
| b | 0.890 | 380–500 | 200 | 27 |
| c | 0.926 | 450–600 | 140 | 26 |
| d | 0.918 | 60–80 | >800 | 25 |
| e | 0.918 | 50 | >1,200 | |

In experiments (a) to (c) the product may be mixed well during the whole of the reaction period; in experiments (d) and (e) agglomerates are deposited on the stirrer and reactor wall and the chlorination in experiment (e) has to be stopped after four hours. The chlorinated polyethylenes (a) to (c) do not exhibit any discoloration in a thermal test at 180° C. while excluding air within one hour, whereas product (d) is strongly discolored after twelve minutes.

We claim:

1. A process for production of chlorinated high pressure polyethylene which comprises mechanically agitating in a stirring vessel or rotating reaction tube and in the absence of solvents and suspension agents a body of compact high pressure polyethylene particles maintained at a temperature in the range of −10° C. to 80° C. and having a particle diameter in the range of 400 to 600 microns, and passing gaseous chlorine through the mechanically agitated body of polyethylene particles to obtain a substantially uniform chlorination of said particles without formation of deposits in the reaction vessel or tube or agglomeration of said particles during the chlorination reaction.

2. A process as claimed in claim 1 wherein said particles have a specific surface of 70–300 cm.²/g.

3. A process as claimed in claim 2 wherein said particles are agitated as a free flowing body of particles throughout the chlorination reaction in a rotating reaction tube.

4. A process as claimed in claim 1 wherein said temperature is 20° to 50° C. and wherein said high pressure polyethylene particles have a density of 0.880 to 0.938 and a molecular weight of 10,000 to 180,000.

References Cited

UNITED STATES PATENTS 2,913,449  11/1969  Hoerger et al. _____ 260—94.9

JOSEPH L. SCHOFER, Primary Examiner

R. A. GAITHER, Assistant Examiner

U.S. Cl. X.R.

260—88.2